Sept. 15, 1959     C. B. ANDREASEN     2,904,035
CONTROL APPARATUS FOR LUNG VENTILATORS
Filed Jan. 29, 1957                                              2 Sheets—Sheet 1
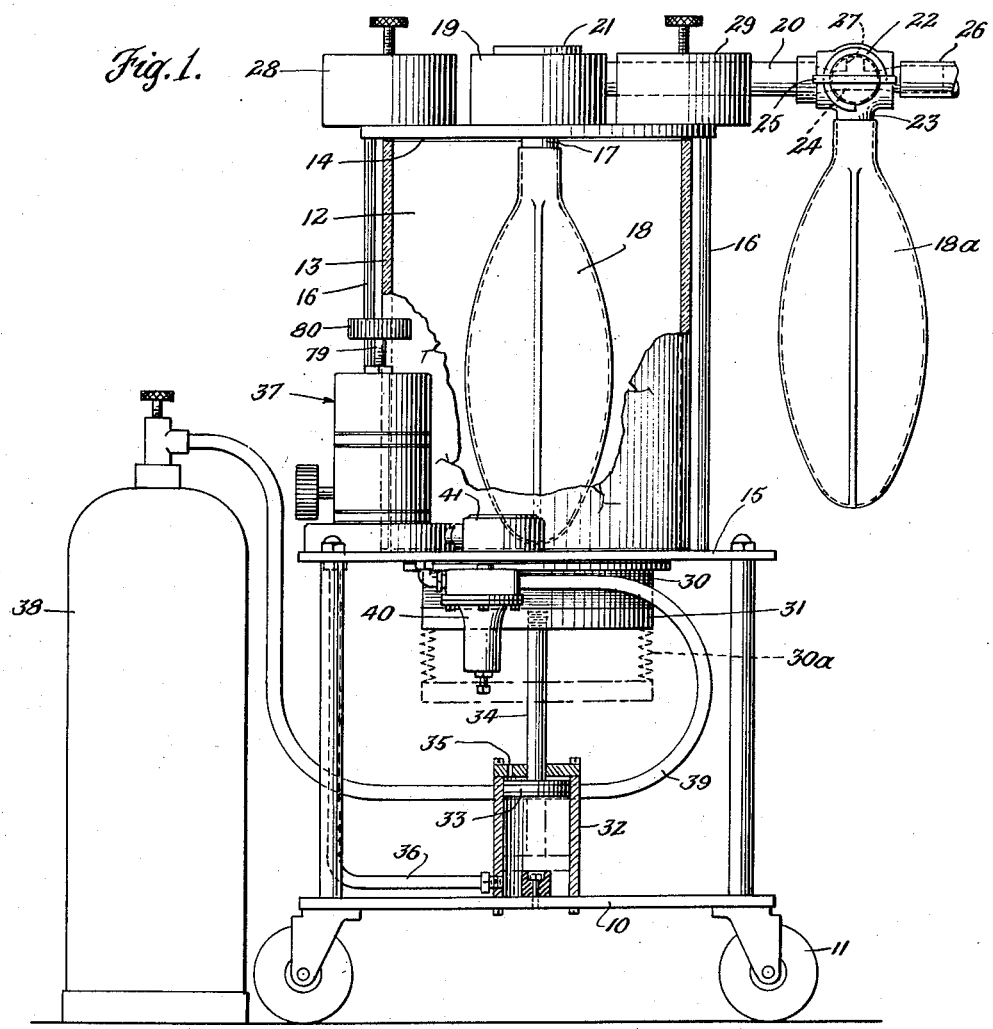
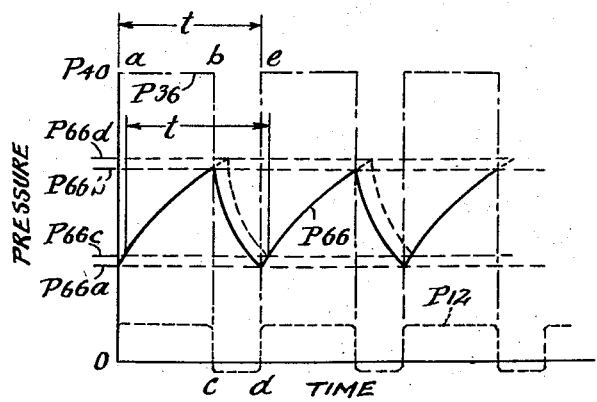
INVENTOR
Christian B. Andreasen
Harris S. Campbell
ATTORNEY Sept. 15, 1959 C. B. ANDREASEN 2,904,035
CONTROL APPARATUS FOR LUNG VENTILATORS
Filed Jan. 29, 1957 2 Sheets-Sheet 2

INVENTOR
Christian B. Andreasen
Harris S. Campbell
ATTORNEY

United States Patent Office 2,904,035
Patented Sept. 15, 1959

2,904,035

CONTROL APPARATUS FOR LUNG VENTILATORS

Christian B. Andreasen, Elkins Park, Pa., assignor to Air-Shields, Inc., Bucks County, Pa., a corporation of Delaware Application January 29, 1957, Serial No. 637,040

8 Claims. (Cl. 128—29)

This invention relates to lung ventilators such as used with anesthesia machines, resuscitators and the like and is particularly concerned with improvements in timing and control devices therefor.

In lung ventilators of the type with which the present apparatus is concerned a variable pressure chamber is used to apply cyclic pressure changes to the gas supplied to the lungs of a patient. Actuating mechanism which is preferably driven by air is provided to produce a positive pressure phase and a negative pressure phase in the cycle of pressure variation. Apparatus of this general nature is shown in my co-pending application, Serial No. 485,229, filed January 31, 1955.

The main object of the present invention is to provide improved apparatus for a lung ventilator for timing and controlling the delivery of compressed air to the driving mechanism which actuates the variable pressure chamber. The timing device improvements provide more reliable operation, longer life and more accurate control of the system.

The nature of the invention and how it accomplishes the advantages will be clearly understood by reference to the accompanying drawings, in which:

Figure 1 is a side elevational view of the lung ventilating apparatus with which the present application is concerned.

Figure 5 is a pressure diagram showing the relationship of pressures with respect to time in various parts of the timing device and ventilator apparatus.

Figure 2:
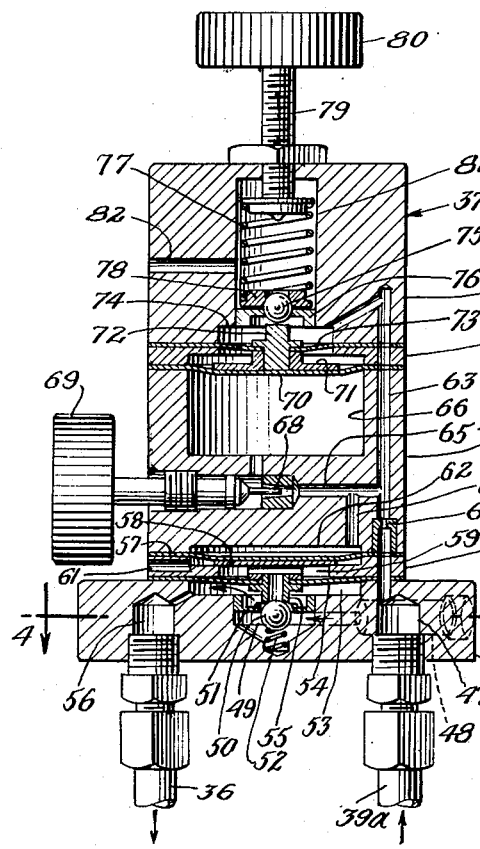
Figure 2 is a sectional view of the timing device of the ventilator apparatus to an enlarged scale, the valve parts being shown in position to deliver gas under pressure.

Referring to Figure 1 it will be seen that the ventilating apparatus is shown supported on a special cart 10 having caster wheels 11. At the upper portion of the apparatus the closed chamber 12 is formed by a cylindrical member 13 which is preferably made of transparent material such as glass or plastic, upper surface plate 14 and lower surface plate 15. Rods 16 maintain these parts in assembled relationship. Supported from the upper surface plate is a pipe 17, on the end of which is attached a flexible wall device in the form of plastic bag 18. Pipe 17 passes through the upper plate 14 and is connected by means of a cylindrical fitting 19 to the horizontal pipe 20. The cylindrical fitting 19 incorporates a pressure gauge 21 which provides a pressure reading of the pressure being developed in the bag 18, and the system connected to it by the pipe 20.

A second bag 18a is shown located outside the chamber 12 and attached to the horizontal pipe 20 by means of a valve unit 22. A downwardly extending nipple 23 attached to valve 22 serves to engage the neck of the bag 18a. The valve 22 includes a channel 24 which extends horizontally through the valve 22 when the handle 25 is in horizontal position as illustrated. In this position pipe 20 and bag 18 are connected directly to the anesthesia machine system through the flexible tube 26. With the handle 25 in the position shown the bag 18a is shut off from the system. Valve 22 also incorporates a short transverse channel 27. When the handle 25 is rotated clockwise through 90° it will be seen that the valve channels are in a position to close off pipe 20 from the delivery tube 26 and connect bag 18a with the flexible tube 26. This provides means for introducing manual operation to the system at any time that it is desired or necessary during adjustment of the automatic mechanism or in case of failure of the automatic system.

The positive and negative values of the pressure in chamber 12 are controlled by means of pressure controlled relief valves. Thus pressure relief valve 28 may be set to control the maximum positive pressure in the chamber 12, valve 28 opening at the adjusted pressure to bleed off excess air when the pressure reaches the adjusted value. Likewise valve 29 controls the value of the negative pressure which may be developed in chamber 12. Valve 29 opens to admit air into the chamber 12 when the negative pressure value for which the valve is adjusted is reached.

A bellows structure 30 is shown attached to the lower plate 15 it being understood that the interior of the bellows 30 and the interior of the chamber 12 are connected together by adequate openings in the plate 15 so that the pressures developed in the interior of the bellows unit 30 are directly transferred to the chamber 12. The stroke of the bellows unit 30 will be observed, the collapsed position being shown in full lines and the expanded position being shown by dotted lines 30a. The lower portion 31 of the bellows unit 30 is provided with a weight capable of inducing the maximum negative pressure which may be required in the cylinder 12 during the return stroke of the bellows unit from the collapsed to the expanded position. The bellows unit 30 is moved from its expanded position to its collapsed position by means of a cylinder 32 and a piston 33 connected to the bellows by a connecting rod 34. It will be noted that a hole 35 in the upper end of cylinder 32 prevents the build-up of back pressure on the upper side of the piston 33.

Gas under pressure is supplied to the cylinder 32 by means of tube 36 which connects to the timing device 37. Gas is supplied to the timing device from any suitable source, such as compressed gas cylinder 38, through the inlet tube 39 and pressure regulator 40. A pressure gauge 41 connected to the inlet channel between the pressure regulator 40 and the timer device 37 shows the pressure being delivered to the timing device.

The general operation of the ventilator device provides for the application of a pressure cycle to the anesthesia machine system which includes both a positive pressure phase and a negative pressure phase. The plastic bag 18 in the chamber 12 has sufficient volumetric capacity to supply the lung requirements of the patient to which the anesthesia machine may be attached. Thus the pressure phases developed in the cylinder 12 may be developed directly in the bag 18 without transferring any of the gases in chamber 12 into the anesthesia machine system. The upward stroke of the bellows 30 is produced by the introduction of gas under pressure to the cylinder 32 the capacity being sufficient to develop the maximum pressure desired in chamber 12. The length of the stroke is sufficient to provide the maximum duration desired for thte positive phase of the cycle. Likewise the return stroke of the bellows unit 30 induces the negative pressure for the desired length of time to produce the negative phase of the cycle in chamber 12. The duration of the pressure phases is under the control of the timing device 37 which alternately connects tube 36 to the pressure source for the upward stroke of the bellows and then connects tube 36 to the atmospheric pressure during the downward stroke.

The timing device 37 is constructed to control the duration of the delivery of gas under pressure to cylinder 32 and also to control the release of pressure therefrom for the negative portion of the cycle. It is the construction of the timing device 37 with which the present invention is primarily concerned, this construction providing for more accurate timing control and more reliable operation with reduced service requirements. The detail construction of timing device 37 and its operation will be more clearly understood by reference to Figures 2, 3, and 4. In Figure 2 the timer parts are shown in position for delivery of gas under pressure to the cylinder 32 for the positive phase portion of the cycle. The timer device includes a body having a base portion 42 and upper portions 43, 44, 45, and 46. The base portion 42 is provided with an inlet opening 47 to which gas under controlled pressure is admitted by means of pipe 39a. A channel 48 in the base portion 42 (see also Figure 4) connects with inlet 47 and leads to valve pocket 49. Channel 48 also connects with the pressure gauge 41.

Valve pocket 49 incorporates a check valve device having a ball member 50 and a seat 51. A spring 52 urges ball 50 against the seat. At the upper side of the seat 51 a small chamber 53 is formed in the base portion 42, the upper side of the chamber 53 being formed by a diaphragm 54 to the center of which is attached a cylindrical member 55. The outlet channel 56 connects the small chamber 53 with the delivery tube 36.

When the diaphragm 54 is in the position shown in Figure 2 it urges cylindrical member 55 against the ball 50 and causes it to move away from the seat 51, thus permitting gas under pressure to flow past the valve ball 50 into the small chamber 53 and out through delivery tube 36. Arrows in Figure 2 show the direction of flow for the position illustrated.

The diaphragm member 54 forming the upper surface of chamber 53 is preferably made from a sheet of flexible material such as rubber or neoprene, which is easy to support in position and will give long service without deterioration due to deflections. Spaced parallel to the diaphragm 54 and slightly above it is a second diaphragm 57 which is attached to disc 58 which in turn is fastened or connected to the cylindrical member 55 to which the diaphragm 54 is connected. Thus diaphragms 54 and 57 form the lower and upper walls of a small chamber 59. It will be seen that cylindrical member 55 has a channel leading through it to chamber 59, said channel being blocked by the ball member 50 when the diaphragm is in the position shown in Figure 2. An exhaust outlet 61 extends through body section 43 from the chamber 59, but with the diaphragm 57 in the position shown in Figure 2, the plate 58 blocks the outlet 61.

Above the diaphragm 57 a small cavity 62 is formed in the body section 44. The pressure fluctuations in the cavity 62 control the position of diaphragms 54 and 57 and thus the operation of the check valve 50. Connected to the inlet opening 47 is a channel 63 which is equipped at its inlet end with a small restrictive orifice 64. Orifice 64 is of sufficient size to permit enough gas to flow through to provide the desired operation of the timer device. Connected to channel 63 are the channel 65 leading to the large control chamber 66 and the channel 67 leading to the small chamber or cavity 62. Interposed in the channel 65 leading to chamber 66 is an adjustable needle valve 68, the adjustment being controlled by external knob 69. It will be understood that by providing a tapered relationship between the valve needle 68 and the adjacent channel opening the effective size of the orifice which admits gas to chamber 66 may be varied by rotation of knob 69. In this way adjustment of flow between chamber 66 and channel 63 is accomplished. It will be noted that the upper surface of chamber 66 is composed of diaphragm 70 which is supported in the body between sections 44 and 45. Supporting plate 71 is attached to the diaphragm 70 and this in turn supports the cylindrical member 72 which is further supported by the parallel diaphragm 73. Above the diaphragm 73 and formed in the upper body section 46 is another control chamber 74 which is connected with the channel 63. Directly above the cylindrical part 72 is a check valve device incorporating a moving valve member in the form of ball 75 and the stationary seat member 76. Valve ball 75 is normally held down on its seat 76 by means of spring 77 which reacts against the ball through the spring plate 78. The upper end of spring 77 is connected to the adjusting screw 79, the outer end of which is attached to a knob 80 for manual control of the adjustment. When ball 75 is lifted off its seat 76, chamber 74 is then open to the cavity 81 in which the spring is mounted, this cavity in turn being connected to the outside atmosphere by relief channel 82.

Figure 3:
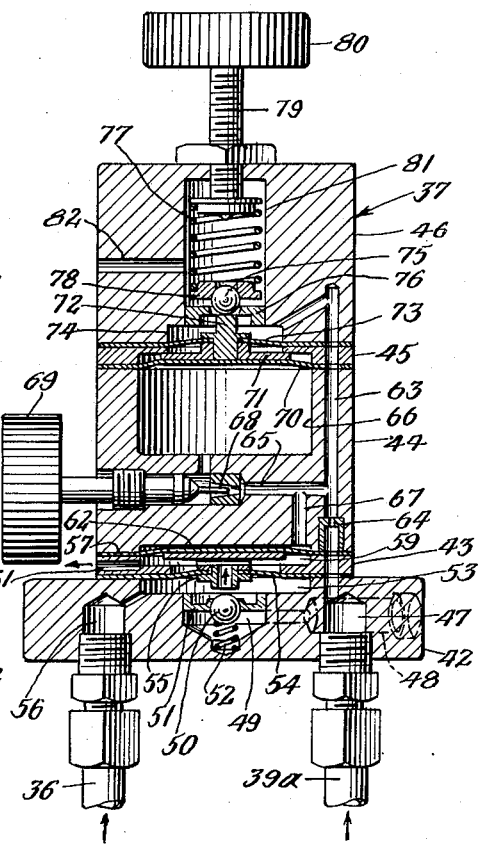
Figure 3 is a sectional view similar to Figure 2 with the valve parts shown in position to shut off gas delivery.
Figure 4:
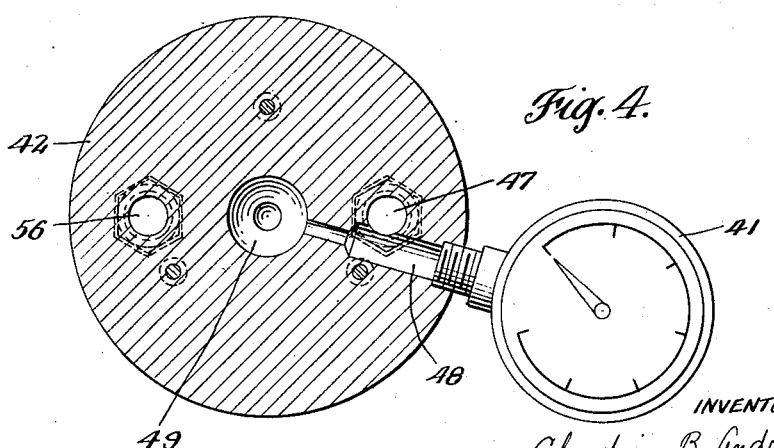
Figure 4 is a sectional view of the timing device taken in the direction of arrows 4—4, Figure 2.

It will be noted that Figures 2 and 3 show exactly the same parts the only difference being in the position of the lower valve parts and the upper valve parts. In Figure 2 the lower valve is held open with the ball member 50 pushed off its seat 51 by virtue of the position of the diaphragms 54 and 57 and the attached cylindrical member 55. Also in Figure 2 the corresponding position of the upper valve unit is such that the valve member 75 is closed by virtue of being seated on the seat member 76, the valve actuating part 72 and its attached diaphragms 70 and 73 being in the "down" position. With the valve parts in the position in Figure 2 it will be observed that gas under pressure may pass from the inlet pipe 39a through channel 48 to the valve and past the valve seat 51 through chamber 53 and out through delivery tube 36. Thus gas under pressure may be delivered to the actuating cylinder 32 to provide the positive pressure stroke of the bellows.

In Figure 3, however, the valve member 75 has been lifted off its seat 76 by virtue of the action of the diaphragm 70 and the attached cylindrical part 72, thereby connecting the channel 63 to atmospheric pressure. The corresponding position of the lower diaphragm 54 and attached cylindrical member 55 is such that it is removed from the valve ball member 50 permitting it to seat and thus close off the flow of air under pressure. At the same time the small chamber 53 is opened to atmospheric pressure through the opening in cylindrical member 55 and outlet 61. With the lower valve members in the position in Figure 3, the connecting tube 36 is now connected to atmospheric pressure and thus permits the piston 33 in the cylinder 32 to travel downwardly under the influence of the expanding bellows during the negative phase of the cycle.

The operation of the timing device will best be understood by reference to Figures 2, 3, and 5. As has previously been mentioned when the valve parts are in the position shown in Figure 2 the ball member is off its seat 51 and permits the gas under pressure to flow from inlet pipe 39a to the outlet pipe 36. When the valve 50 is opened it is because the pressure at the upper side of diaphragm 57 is equal to the delivered pressure in line 39a. Since the effective area of plate 58 and diaphragm 57 is greater than the effective area below disc 58, it is forced down against its seat and thus carries the cylindrical member 55 with it to hold the valve ball member 50 in open position. This position is held as long as the pressure in chamber 62 above diaphragm 57 is maintained at line pressure 39a. This pressure is represented in Figure 5 by $P_{40}$, the regulated pressure. Since chamber 62 is connected with channel 63 these will be at the same pressure. As long as the upper valve ball 76 remains closed the pressure in channel 63 will remain at line pressure $P_{40}$ because it is connected to the inlet pipe 39a by means of the orifice 64.

Control chamber 66 is connected with channel 63 by means of the adjustable orifice at needle valve 68. Because of the restriction at needle valve 68 an interval of time will be required for sufficient air to bleed through from channel 63 to chamber 66 before the pressure in chamber 66 will increase to an appreciable extent. When the pressure in chamber 66, represented on Figure 5 by the solid saw-toothed line $P_{66}$, increases to the value $P_{66b}$, it is sufficient to cause diaphragm 70 to move against the force of spring 77. By virtue of the fact that the area of the diaphragm 70 and plate 71 is greater than the area of the chamber 73, a lower pressure in chamber 66 than in chamber 73 can cause the diaphragm 70 and its connected cylindrical part 72 to move upwardly to the position shown in Figure 3. In so doing valve ball 75 is opened. As soon as the upper valve 75 opens, it immediately permits the pressure in channel 63 to drop to atmospheric and thus at the same instant the lower valve ball 50 is closed by virtue of the upward movement of diaphragm 54. This opens up the channel in the cylindrical member 55 to permit the pressure in tube 36 to fall to atmospheric pressure and also permits air to move back through tube 36 from the actuating cylinder 32 during the return stroke of the cylinder.

In Figure 5 the pressure in connecting tube 36 is shown by broken dotted line $P_{36}$ and at point $b$, which is the point on the time scale when the upper valve opens, the pressure in the connecting tube 36 immediately drops to zero or atmospheric. During the time from $c$ to $d$ the gas is exhausting through connecting tube 36 and through the channel in valve cylindrical member 55 and out through exhaust outlet 61. During this time when the upper valve 75 is open, the pressure in channel 63 is lower (atmospheric) than the pressure in chamber 66. Therefore, the air in chamber 66 bleeds slowly back through the needle valve 68 from chamber 66 to channel 63 until the pressure in chamber 66 is reduced to a value indicated in Figure 6 as $P_{66a}$. At this value of pressure the force in spring 77 is sufficient to push the diaphragm 70 down to its lower position as shown in Figure 2 thus closing the valve ball 75. This closes the exhaust from channel 63 and the pressure in this channel immediately builds up to line pressure $P_{40}$ as indicated in Figure 5 where pressure $P_{36}$ changes from $d$ to $e$.

This then represents a complete cycle of the timing device. As indicated in Figure 5 pressure is delivered through delivery channel 36 for the time represented by the distance from $a$ to $b$. The timer then shifts the valves so that the pressure falls to zero for a length of time represented by the distance from $c$ to $d$, at which time pressure again increases to regulated pressure as indicated at $e$. This action of the timer thus controls a complete cycle of the ventilator unit. The pressure developed in chamber 12 and the anesthesia machine system during the cycle is represented by the line $P_{12}$ in Figure 5. The upward stroke of the bellows is indicated by the portion of $P_{12}$ lying between 0 and $c$ while the downward stroke of the bellows or the negative phase of the cycle is represented by the part of $P_{12}$ lying below the zero line between $c$ and $d$. The pressure in chamber 12 as previously described is controlled by the pressure relief valves 28 and 29 of chamber 12.

If it is desired to increase the length of the complete cycle, that is to reduce the respiration rate, needle valve 68 is adjusted by means of knob 69 so as to make the bleeding action at valve 68 slower. Thus it takes a longer time for the pressure in chamber 66 to change from low pressure 66a to high pressure 66b and also a longer time to reduce pressure on the negative phase of the cycle from 66b to 66a. This increases both the positive phase and the negative phase in the same proportion.

If it is desired to change the relative value or time of the positive phase as compared to the time of the negative phase without changing the cycle frequency, the force on the upper valve ball 75 is changed by adjusting spring 77 through the medium of knob 80. Increasing the spring load has the effect of increasing the pressure required in chamber 66 before opening occurs and thus increases the length of time for the positive cycle. With the higher load in the spring, the valve ball 75 is closed after a shorter interval thus also reducing the time for the negative phase of the cycle.

The relationships which produce this change in phase relationship will be clearly seen by reference to Figure 5. Increase in spring load has the effect of raising pressure values $P_{66a}$ and $P_{66b}$ to $P_{66c}$ and $P_{66d}$. It will be noted that the shape of the control pressure curve during the positive phase is convex upwardly while during the negative phase it is convex downwardly. Thus the slope of the positive phase curve is greater at the lower end while the negative phase curve has a steeper slope at the upper end. As a result of this relationship raising the control pressures in the above manner causes an increase in time for the positive phase and a decrease in the negative phase time.

The dotted adjusted curve $P_{66}$ in Figure 5 shows the effect of increasing the release pressure for chamber 66. While the complete cycle time $t$ is not changed by raising the valve release pressure from $P_{66b}$ to $P_{66d}$ it will be seen that the postive phase portion involves a longer time while the negative phase portion is shorter.

It should be understood that the various pressures shown in Figure 5 are not necessarily in proper proportion. A suitable regulated control pressure may be 15 p.s.i. while the chamber 12 pressure may, for example, vary from 25 cms. water to a negative value of —10 cms. water.

With the two timer device adjustments described above full control of the cycle and phase relationships is available. The use of flexible membranes or diaphragms of the type described provides a structure which can operate continuously without being subject to fatigue failure such as may be experienced in a diaphragm subject to bending stresses. As a result of the improved construction the operation of the ventilator is more even and danger of malfunction at a critical time is reduced.

I claim:
1. Lung ventilating apparatus including a variable pressure chamber, a flexible container mounted in said chamber and having a connection for attachment to an anesthesia machine system, equipment for inducing pressure variation in said chamber including a gas operated timing device for controlling delivery of gas under pressure to said equipment, said device having an inlet for supplying compressed gas, an outlet from said device leading to said equipment, an internal channel in said device between said inlet and said outlet, a valve in said internal channel for controlling flow to said outlet, said valve being actuated by a diaphragm assembly, a control chamber in said device having a connecting channel to the inlet to provide a supply of compressed gas, a metering orifice in said connection between the inlet and the control chamber, a second diaphragm assembly forming a wall portion of said control chamber, a chamber adjacent the side of said second diaphragm assembly outside said control chamber with a connection to said inlet, a relief valve mechanism adjacent said second diaphragm assembly and operable thereby.

2. A construction according to claim 1 in which a second metering orifice is located closer to said control chamber than said first metering orifice, said second orifice having a manual adjustment to control the rate of flow to and from the control chamber.

3. A construction according to claim 1 in which said relief valve mechanism includes a spring member and a manual adjustment to vary the load in the spring member to control the valve opening pressure.

4. A construction according to claim 1 in which said first mentioned diaphragm assembly incorporates a pair of spaced walls forming a small chamber therebetween, a relief channel leading from said small chamber to the atmosphere, a valve controlled passage between said small chamber and said internal channel.

5. A construction according to claim 1 in which one of said diaphragm assemblies includes a wall made from a flexible material and an adjacent supporting disk of rigid material.

6. A construction according to claim 1 in which the second diaphragm assembly adjacent the relief valve mechanism is constructed with a greater area exposed to the control chamber side than the area exposed outside the control chamber.

7. A construction according to claim 1 in which the first mentioned diaphragm assembly for actuating the flow control valve incorporates a double wall structure in which the effective area of the diaphragm is less on the valve side than the area on the side connected to the control chamber.

8. A gas operated timing device suitable for use with lung ventilating equipment having a variable pressure chamber, said device being constructed to control the delivery of gas under pressure to such equipment, an inlet to said device for supplying compressed gas, an outlet from said device to connect to such equipment, a spring actuated valve located between said inlet and said outlet, a diaphragm assembly having a part engageable with said valve to connect said inlet to said outlet, a chamber adjacent said diaphragm assembly, a channel having a restricted flow orifice therein connecting said chamber and said inlet, said valve engageable part having a relief channel through it leading to the outside atmosphere, a second valve and a second diaphragm assembly, a control chamber for said second diaphragm assembly, a channel fed by said restricted flow orifice leading to said second valve, another channel leading to said control chamber, a variable restrictive valve in said channel to the control chamber, said control chamber causing actuation of said second diaphragm assembly to open said second valve when the pressure therein reaches a suitable value, said second valve releasing to atmospheric pressure, and manual adjustment means connected to said second valve to vary the opening load.

References Cited in the file of this patent

UNITED STATES PATENTS

| | | |
|---|---|---|
| 2,567,224 | McKee et al. | Sept. 11, 1941 |
| 2,582,210 | Stanton | Jan. 8, 1952 |

UNITED STATES PATENT OFFICE
CERTIFICATE OF CORRECTION

Patent No. 2,904,035                                            September 15, 1959

Christian B. Andreasen

It is hereby certified that error appears in the printed specification of the above numbered patent requiring correction and that the said Letters Patent should read as corrected below.

Column 5, line 38, for "Figure 6" read -- Figure 5 --.

Signed and sealed this 5th day of April 1960.

(SEAL)
Attest:

KARL H. AXLINE
Attesting Officer

ROBERT C. WATSON
Commissioner of Patents